May 10, 1938.  B. H. BROWALL  2,116,824
VEHICLE BRAKE, ESPECIALLY FOR RAILWAY CARS
Filed Feb. 15, 1935
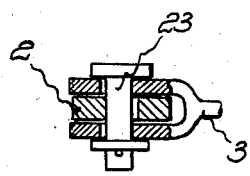
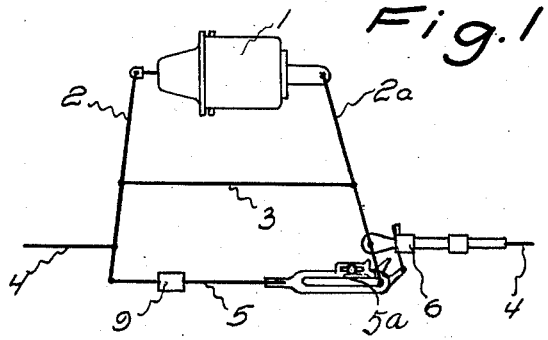
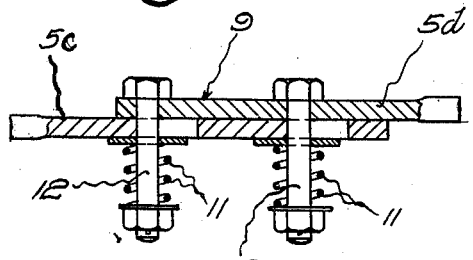
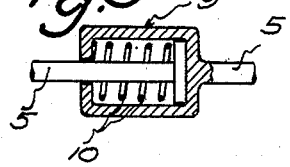
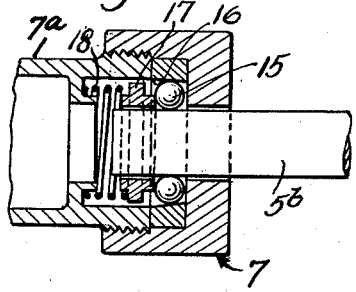
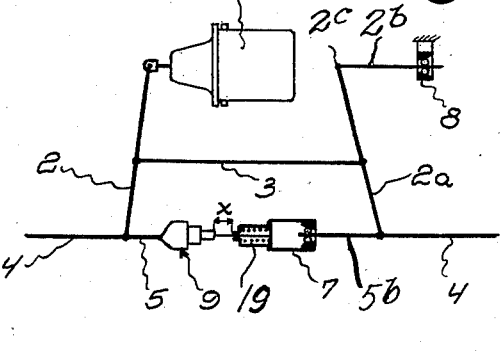
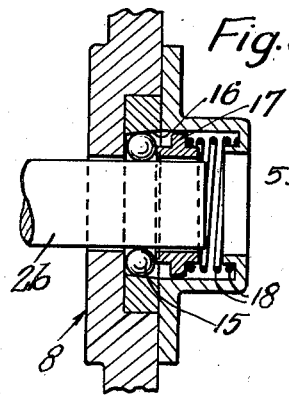
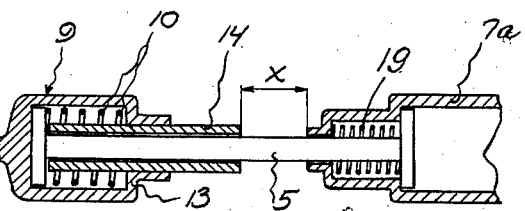
Inventor:
B. H. Browall Patented May 10, 1938

2,116,824

UNITED STATES PATENT OFFICE 2,116,824

VEHICLE BRAKE, ESPECIALLY FOR RAILWAY CARS

Bert Henry Browall, Malmo, Sweden, assignor to Svenska Aktiebolaget Bromsregulator, Malmo, Sweden, a corporation of Sweden Application February 15, 1935, Serial No. 6,749
In Germany and Switzerland February 26, 1934

7 Claims. (Cl. 188—198)

In vehicle brakes, especially common brakes for railway cars provided with a slack adjuster mounted in the brake rigging and adapted automatically and in dependence on the length of stroke of the brake piston to restore said stroke to a normal value when it has been increased due, for instance, to wear of the brake shoes, an actuating device frequently is provided for, for instance in the form of a rod connected across the brake levers, or between a brake lever and a fixed point on the car framing, the slack adjuster being actuated by said actuating device in a direction for reducing the slack between the brake shoes and the wheels when the brake piston stroke exceeds the normal value. A disturbance may frequently occur in the known brake riggings including such an actuating device for the slack adjuster due to the fact that the increased amount of play between the brake lever or levers and their connecting or interconnecting rod or rods, which is caused by wear of the bolts and holes of said rods and levers, will permit the brake levers to increase the distance between their free ends under the action of forces transmitted to said lever ends from the main pull rods connected thereto. This increase of distance between the lever ends can be of such an extent that unintentional forces arising for instance due to switching shocks on account of inertia of the rods, brake beams and brake shoes etc., which forces stretch the brake rigging and may amount to a considerable value, are transmitted to the aforesaid actuating device before they can be taken up by the connecting or interconnecting rod or rods for the brake levers. In consequence hereof the said actuating device which normally is subjected to relatively small stresses only must nevertheless and in view of the desired margin of safety be dimensioned so as to withstand the high stresses occasionally arising therein. In such instances in which the said actuation device is in the form of a connection rod of variable length, and especially when the same is provided, for the purpose of variation the length thereof, with a toothed rack or with a ball ratchet means or the like, the said ratchet means runs the risk to be jammed or damaged due to unintentional forces arising by inertia on account of switching shocks or the like.

The invention refers to a device for elimination of the drawbacks referred to in the foregoing, a number of different constructional embodiments of the same being shown in the annexed drawing.

In the drawing:—

Fig. 1 is a diagrammatic plan view of a railway car brake provided with a rod mounted between the free ends of the brake levers, such rod being adapted for actuation of a slack adjuster mounted in one of the main pull rods.

Fig. 2 is an enlarged detail section of the connection means between one of the brake levers and the jaw of an intermediate pull rod or connection rod between said levers.

Fig. 3 is a longitudinal section of the device according to the invention and illustrates one embodiment of the same, such device being mounted in a rod mounted between the free ends of the brake levers and adapted to relieve said rod from the increased tensional stresses otherwise transmitted thereto from the main pull rods due to influence from the mass of the rigging when subjected to switching shocks or the like.

Fig. 4 is a section illustrating another embodiment of the invention.

Fig. 5 is a diagrammatical plan view of another type of brakes provided with a rod of variable length mounted between the free ends of the brake levers and including a ball ratchet means.

Fig. 6 is a longitudinal section of the embodiment of invention employed according to Fig. 5, drawn to a larger scale.

Figs. 7 and 8 are enlarged detail sections of the ball ratchets shown diagrammatically in Fig. 5.

In the drawing, 1 is the brake cylinder, 2 and 2a are the brake levers, 3 is the main connection rod between said levers, 4, 4 are the main pull rods connected at the free ends of the brake levers, and 5 is the rod of the actuating device mounted between said brake lever ends.

According to Fig. 1, a slack adjuster 6 is mounted in one of the main pull rods 4, and the actuation of said slack adjuster is performed by means of a slotted guide-plate 5a mounted in the rod 5. As regards the construction and operation of this guide-plate 5a and of the slack adjuster used in connection therewith the U. S. Patent No. 1,848,991 is referred to, compare also the U. S. Patent No. 1,983,897. In the brake construction according to Fig. 5, a ball ratchet means 7 is mounted in the rod 5, and the slack adjuster 8 is provided for in connection with the fulcrum of the lever 2a and comprises a ball ratchet means for a slidable rod 2b to which the lever 2a is fulcrumed at 2c. The construction of the slack adjusters and the mounting of the same may be considered to be previously known, and it seems superfluous specifically to describe them in this connection. It is shown in Figs. 7 and 8 however, how the ball ratchets 7 and 8 in Fig. 5 may be constructed, each of them comprising a series of balls 15 between the relatively slidable part 5b of rod 5 or the rod 2b and a surrounding, tapering seat 16, the balls being urged in one direction by a ring 17 pressed by a spring 18.

Due to inertia of the mass of the brake shoes and brake beams, quite considerable tensional stresses may occur in the main pull rods due to switching shocks and the like, such stresses tending to increase the distance between the free ends of the brake levers. The transmission of these tensional stresses between the brake levers 2 and 2a is normally performed by the connection rod 3, but on account of wear of the bolts 23 and the corresponding holes in the connection rod and the brake levers, the play will be increased at these connection points (compare Fig. 2), and then the brake levers may be permitted, in spite of the presence of the connection rod 3, to increase the distance between their free ends to such an extent that the transmission of the considerable tensional stresses referred to in the foregoing will take place by the intermediary of the rod 5 mounted between the free ends of the levers 2. This will result in that quite considerable stresses, which may amount to the same order as the total stresses in the main pull rods at full braking, may arise in the rod 5 and cause serious disturbances.

For eliminating this source of disturbance the rod 5, according to the invention, is provided with a device which is resilient when the rod is subjected to greater tensional stresses arising therein under normal working conditions, and the resiliency of said device is sufficient to permit the brake levers to increase the distance between their free ends at least so much as corresponds to the maximal play which can occur due to wear at the connection bolts 23.

The resilient device referred to in the foregoing has the general reference 9 in the drawing, and in the embodiment illustrated in Fig. 3 it is provided for by having the rod 5 divided in two parts which are slidable in relation to each other in a direction for increase of the length of the rod 5 against the action of a spring 10. In constructional respect an equivalent device may be carried out in any desired manner, and it may be mounted at any desired point of the rod 5. The spring 10 is sufficiently strong not to be compressed by the tensional stresses occurring in the rod 5 at its normal action for actuation of the slack adjuster.

Whereas the resilient device mounted in the rod 5 according to Fig. 3 is constructed so as to return to its original position when the stresses causing the extension of the rod are relieved, the device may also be constructed so as not to return into its original position but to remain in the extended one when once brought in action. Fig. 4 shows an example of a device constructed in the last mentioned manner. According to this embodiment the resilient device 9 in the rod 5 consists therein that the adjacent ends 5c and 5d of the two parts of rod 5 overlap and are frictionally slidable in relation to each other, being pressed against each other by means of springs 11 mounted on bolts 12 penetrating both of the rod parts one of which is provided with longitudinal slots for said bolts. In the embodiment according to Fig. 6 the spring housing 13 connected with one of the rod parts 5 is frictionally slidable on a sleeve 14, which is slidable on the other rod part 5 and forms an abutment for actuation of the ball ratchet means 7 in case the brake piston stroke should exceed its normal value when braking. At a braking operation, provided that the brake piston travel is of normal value, the sleeve 14 approaches the housing of the ball ratchet means 7 just as much as to consume the idle motion $x$, the spring 19 in the housing 7a of the ratchet means 7 holding the latter in tension to prevent the relatively slidable part 5b of rod 5 from sliding further into the ratchet means 7. If the brake piston travel at a braking operation exceeds the normal value, the ends of the levers 2 and 2a, to which the pull rods 4 are attached, approach each other by an amount greater than the distance $x$ so that the sleeve 14, after having been moved over the distance $x$, abuts the housing 7a of the ratchet means 7 and relieves the latter from tension so as to allow the relatively slidable part 5b of rod 5 to be slid further into the ratchet means 7 by an amount corresponding to the difference between the approach of the said ends of the levers 2 and 2a towards each other and the distance $x$. At the following release of the brake the said ends of the levers 2, 2a can withdraw from each other only by the amount $x$ which in this case does not correspond to the whole return stroke of the brake piston (the return stroke being equal to the application stroke of the brake piston, which in this case exceeded the normal value corresponding to the idle motion $x$). The last portion of the return stroke, therefore, will result in a displacement of the lever 2, the tie rod 3 and the lever 2a in the direction of the return stroke of the brake piston, whereby the slidable rod 2b will be slid further into the ball ratchet 8 by an amount corresponding to the amount by which the brake travel at the application of the brakes exceeded the normal value. By this displacement of the rod 2b relatively to the ratchet means 8 the brake is adjusted so that the brake piston travel at the next braking operation will be the normal one corresponding to the idle motion $x$. When the rod 5 is extended under compression of the spring 10, the spring housing 13 will be displaced on the sleeve 14 a distance corresponding to the amount of extension, and the idle motion $x$ provided for in connection with the rod 5 will be reduced with the same amount when the normal length of the rod is re-established again, so that the ball ratchet device 7 is actuated for an alteration of the length of the rod 5 when said amount of idle motion is exceeded at the braking. As the aforesaid extension of the rod 5 corresponds to the play at hand at the bolts 23, the reduction of the idle motion will also correspond to the said play, and consequently the influence from the said play on the brake piston stroke will be eliminated in this manner. An entirely analogous compensation of the influence from the play at the bolts 23 will also be obtained in case the embodiment of invention shown in Fig. 4 is employed in connection with the brake construction according to Fig. 1.

The invention is not limited to the embodiments shown in the drawing and described above for the sake of explanation, and it is obvious to those skilled in the art that the particulars of construction may be still further varied within wide limits while maintaining the same purpose and manner of action.

What I claim and desire to secure by Letters Patent is:—

1. In a vehicle brake rigging of the character described, a slack adjuster mounted in the brake rigging, an actuating device for said slack adjuster, operatively connected in the brake rigging, and a yielding means associated with said actuating device and allowing said actuating device, should it be subjected to relatively heavy stresses such as may result from the brake rigging being stressed due to shocks at shunting of the vehicle, to yield in the direction of said stresses, said yielding means being resistant in said direction to the relatvely moderate stresses arising in said actuating device at the normal operation thereof for actuating said slack adjuster.

2. In a vehicle brake rigging of the character described, including interconnected brake levers, main pull rods connected to said levers, a slack adjuster mounted in one of said pull rods, and an actuating device for said slack adjuster, connected between said brake levers so as to be operated by the relative movement thereof, a yielding means associated with said actuating device and allowing said actuating device, should it be subjected to relatively heavy stresses such as may result from the brake rigging being stressed due to shocks at shunting of the vehicle, to yield in the direction of said stresses, said yielding means being resistant in said direction to the relatively moderate stresses arising in said actuating device at the normal operation thereof for actuating the slack adjuster.

3. A brake rigging as claimed in claim 1, in which the yielding means is resilient to restore the actuating device to its original condition when the stresses causing yielding cease.

4. A brake rigging as claimed in claim 2, in which the actuating device comprises a rod connected between the brake levers and made in two parts yieldingly connected with each other by means of a spring of sufficient strength to withstand stresses arising in the rod at normal operation thereof for actuating the slack adjuster.

5. A brake rigging as claimed in claim 2, in which the actuating device comprises a rod connected between the brake levers and made in two parts frictionally slidable in longitudinal direction in relation to each other, the friction being sufficient to withstand stresses arising in the rod at normal operation thereof for actuating the slack adjuster.

6. In a vehicle brake rigging of the character described, including a brake lever, a slack adjuster and an actuating device therefor, said actuating device comprising a rod operatively connected to the brake lever and including a ratchet means making the effective length of the rod variable, and an abutment carried by the rod for operating said ratchet means, an idle motion being provided for in the rod between the said ratchet means and the abutment for operating it, said idle motion corresponding to a normal braking movement of the brake rigging, a resilient yielding means provided in the rod and allowing the latter to yield only to stresses of a greater order than those arising therein under normal operation thereof for actuating the slack adjuster, the said abutment for operating the said ratchet means being so connected with the said yielding means that the said abutment will be adjusted by the said yielding means in a direction for reducing the said idle motion between the abutment and the ratchet means.

7. A brake rigging as claimed in claim 6, in which the yielding means comprises a spring housed in a housing secured on one part of the rod and frictionally slidable on a sleeve slidable on another rod part longitudinally movable relativey to the first mentioned rod part, the said sleeve forming the abutment for operating the ratchet means.

BERT HENRY BROWALL.